(12) United States Patent
Garin et al.

(10) Patent No.: US 9,046,336 B2
(45) Date of Patent: Jun. 2, 2015

(54) DEVICE FOR INSPECTING THE RINGS AND NECKS OF CONTAINERS

(75) Inventors: Jean-François Garin, Saint-Romain en Gal (FR); Dominique Pitaval, Saint-Christo en Jarez (FR)

(73) Assignee: MSC & SGCC, Vourles (FR)

( * ) Notice: Subject to any disclaimer, the term of this patent is extended or adjusted under 35 U.S.C. 154(b) by 250 days.

(21) Appl. No.: 13/825,615

(22) PCT Filed: Sep. 28, 2011

(86) PCT No.: PCT/FR2011/052269
§ 371 (c)(1),
(2), (4) Date: May 31, 2013

(87) PCT Pub. No.: WO2012/042175
PCT Pub. Date: Apr. 5, 2012

(65) Prior Publication Data
US 2013/0247404 A1    Sep. 26, 2013

(30) Foreign Application Priority Data
Sep. 28, 2010    (FR) ..................... 10 57791

(51) Int. Cl.
| | |
|---|---|
| *E01C 23/01* | (2006.01) |
| *G01B 3/34* | (2006.01) |
| *G01B 5/02* | (2006.01) |
| *G01B 5/08* | (2006.01) |
| *G01B 7/12* | (2006.01) |
| *G01B 21/10* | (2006.01) |

(52) U.S. Cl.
CPC .. *G01B 5/02* (2013.01); *G01B 5/08* (2013.01); *G01B 7/12* (2013.01); *G01B 21/10* (2013.01)

(58) Field of Classification Search
CPC .............. G01B 3/50; G01B 5/08; G01B 5/12; G01B 7/12; G01B 21/10
USPC ................. 33/522, 542, 543, 550, 551, 555.1
See application file for complete search history.

(56) References Cited

U.S. PATENT DOCUMENTS

| | | | | |
|---|---|---|---|---|
| 3,073,034 | A | * | 1/1963 | Antoszewski .................. 33/522 |
| 3,100,570 | A | * | 8/1963 | White ............................. 33/542 |
| 3,390,569 | A | | 7/1968 | McMeekin |
| 3,771,650 | A | * | 11/1973 | Henderson et al. .......... 33/555.1 |
| 3,914,872 | A | * | 10/1975 | Strzala ........................... 33/522 |

(Continued)

FOREIGN PATENT DOCUMENTS

| | | |
|---|---|---|
| FR | 2174203 | 10/1973 |
| FR | 2818748 | 6/2002 |
| GB | 1 432 120 | 4/1976 |

*Primary Examiner* — G. Bradley Bennett
(74) *Attorney, Agent, or Firm* — Clark & Brody

(57) ABSTRACT

A device for inspecting rings and necks of containers includes a movable element with an outer gauge for checking the outside of the ring of the containers, and an inner gauge for checking the inside of the ring and neck of the containers. The movable element includes a system for measuring the position of the movable element relative to the frame, a system for detecting contact between the inner gauge and the container, a system for detecting contact between the outer gauge and the container, and a processing unit for determining, on the basis of the measurements of the position of the movable element and of the instances of contact between the gauges and the container, whether or not the size of the rings and/or necks of the containers are acceptable, and the types of defects for the containers whereof the sizes of the rings and/or necks are not acceptable.

17 Claims, 6 Drawing Sheets

(56) References Cited

U.S. PATENT DOCUMENTS

Figure 1:
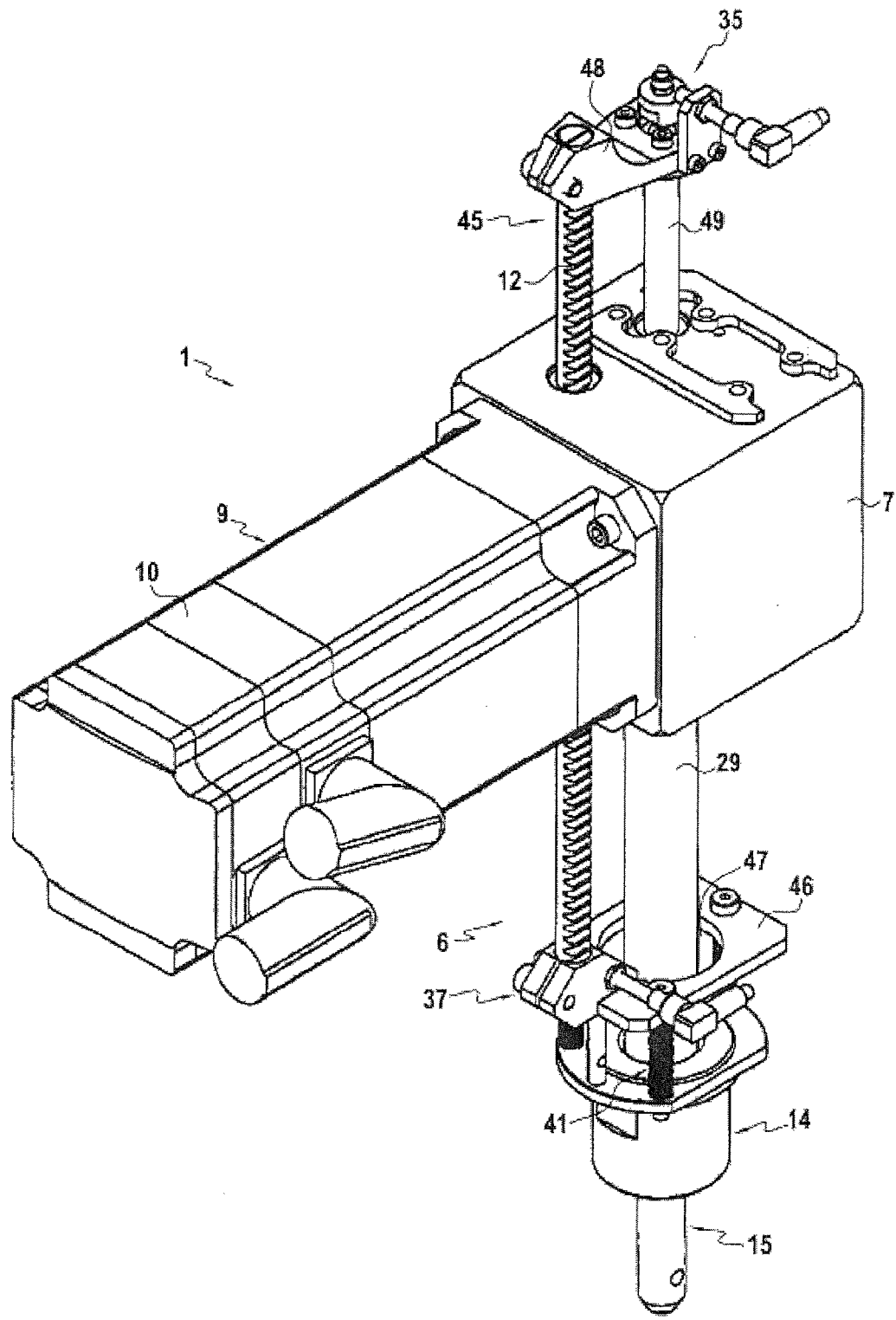

| | | | |
|---|---|---|---|
| 4,307,514 A * | 12/1981 | Ange et al. | 33/544.2 |
| 4,798,096 A | 1/1989 | Bogatzki | |
| 4,955,227 A * | 9/1990 | Fujita et al. | 73/104 |
| 5,313,847 A * | 5/1994 | Giometti | 73/865.8 |
| 5,414,939 A * | 5/1995 | Waugaman | 33/522 |
| 5,761,820 A * | 6/1998 | Emery | 33/522 |
| 6,041,512 A * | 3/2000 | Wacke | 33/522 |
| 2005/0022408 A1* | 2/2005 | Wendt et al. | 33/522 |
| 2006/0000299 A1* | 1/2006 | Leroux et al. | 33/522 |
| 2008/0066332 A1* | 3/2008 | Metcalf et al. | 33/555.1 |

* cited by examiner

DEVICE FOR INSPECTING THE RINGS AND NECKS OF CONTAINERS

The present invention relates to the technical field of inspecting hollow objects or containers generally speaking, for example such as bottles, jars, or vials, in particular made from glass, in order to detect any size or surface defects of such containers.

In the technical field of inspecting containers, in particular glass containers, after those containers are manufactured, various checks are done, in particular of the mouth or ring of the container (inner/outer diameters, sealing, height) and the neck of the container (inner diameter, inner profile, broaching).

In order to perform such inspections, it is known to use one or more devices each including an inspection head designed to be lowered either over a specific distance as a function of the nature of the container, or so as to come into contact with the container, or to bear on the container during the time needed for the inspection. Traditionally, such an inspection is done using a machine having either a linear conveyor suitable for keeping the containers in precise positions, or a star conveyor, with an indexed circular movement to place the containers relative to the various inspection stations. Each inspection head is moved in an alternating vertical movement for a star conveyor, whereas for a linear conveyor, the inspection head additionally has a horizontal movement.

Patent FR 2,818,748 describes an inspection device including a head mounted on a horizontal guideway that is fixed on a carriage moved in alternating vertical movements by a belt mounted between a free pulley and a pulley driven by a servomotor. One of the drawbacks of such a device is the relatively large displaced mass, which limits the speed and acceleration of the movement of the inspection head. As a result, the inspection rhythm of the containers is limited, which is a major drawback in the production line process for producing containers. Another drawback of such a known device appears when the inspection head is designed to come into contact with the container. In fact, the travel of the inspection head is not defined due to the height dispersion of the containers and the defects that influence that travel, such as those not allowing the inspection head to descend during the broaching operation. Additionally, in light of the indetermination of that travel and the onboard mass, a significant impact may occur between the inspection head and the container, which is capable of causing the deterioration of the container and/or of the inspection head. Lastly, such a device does not make it possible to determine the origin of the detected defects.

Patent GB 1,432,120 describes a device for inspecting containers having several inspection stations, one of which aims to verify the dimensional compliance of the rings and necks of the containers. This inspection station has a movable element driven by a drive system in an alternating movement relative to the frame of the device, in a movement direction parallel to the axis of symmetry of the containers. This movable element is equipped with an outer gauge for checking the outside of the ring of the containers and an inner gauge for checking the inside of the ring and neck of the containers.

The device described by this document GB 1,432,120 has the same drawbacks as the inspection device described by patent FR 2,818,748.

Likewise, U.S. Pat. No. 3,390,569 describes a device for checking the inner and outer parts of container rings. This device includes a movable element provided with a testing pin designed to bear on the inner part of the ring and a testing bell designed to bear on the outer part of the ring. When the bell and the pin bear on a container, they define a chamber that is depressurized to determine whether the container is acceptable or defective.

The device described by this document U.S. Pat. No. 3,390,569 has the same drawbacks as the inspection device described by patent FR 2,818,748.

Also known from patent application FR 2,174,203 is an inspection machine for checking the rings and necks of containers including a movable element driven by a drive system in a cyclical alternating movement relative to the frame of the machine. The movable element is moved in a vertical direction parallel to the axis of symmetry of the containers. The movable element is equipped with a gauge or instrument for checking the outside of the ring. This instrument is mounted at one end of a lower sleeve guided in alternating vertical sliding relative to the frame.

The movable element also includes an upper sleeve mounted coaxially to the inside of the lower sleeve and provided with a gauge or indicator for checking the inside of the mouth of the container.

Each sleeve is provided with a collar designed to pass inside a notch of a lever when the instrument and the indicator are in a position corresponding to a non-defective container. If the container does not meet the stipulated allowances, one and/or the other of the sleeves is in a position in which the collar actuates the lever, which triggers a switch indicating that the dimensions of the bottle do not meet the predetermined allowances.

Such a device makes it possible to determine whether the detected defect comes from the mouth or the outside of the ring. However, such a device does not make it possible to determine the nature of the dimensional defect detected by the indicator, for example such as a mouth that is too narrow or too wide, and by the instrument, for example such as a ring that is too large or too small.

However, it appears important to distinguish between the natures of the defects exhibited by the defective containers so as to best alter the manufacturing method for those containers.

U.S. Pat. No. 4,798,096 describes an inspection device making it possible to detect the presence of glass filaments inside a glass container. This device includes a movable pin whereof the free end is equipped with a plate movably mounted relative to the pin and relative to proximity sensors. The movement of the plate is detected when it encounters glass filaments, in particular during the lowering movement of the pin inside the container.

This patent indicates that this inspection device is capable of determining whether the glass elements extend either from the bottom of the container, or between the inner walls of the container. However, this device is not suitable for determining whether the size of the rings and/or the necks of the containers is acceptable.

The aim of the present invention is to resolve the drawbacks of the state of the art by proposing a device enabling a fast-paced inspection of the ring and the neck of containers to verify the size compliance of the rings and necks of the containers and to determine the type of defects detected.

To achieve such an aim, the subject-matter of the invention relates to a device for inspecting the rings and necks of containers. According to the invention, the inspection device comprises:

a movable element driven by a drive system in an alternating movement relative to the frame, in a direction of movement parallel to the axis of symmetry of the containers, the movable element being provided with an outer gauge for checking the outside of the ring of the containers, and an inner gauge for checking the inside of the ring and neck of the containers, a system for measuring the position of the movable element relative to the frame, in the direction of movement, the measurements of the position of the movable element being provided to a processing unit, a system for detecting the contact between the inner gauge and the container, during the movement of the movable element, the instances of contact being provided to the processing unit, a system for detecting the contact between the outer gauge and the container, during the movement of the movable element, the instances of contact being provided to the processing unit, and a processing unit for determining, on the basis of the measurements of the position of the movable element and of the instances of contact between the gauges and the container, whether or not the size of the rings and/or necks of the containers are acceptable, and the types of defects for the containers whereof the sizes of the rings and/or necks are not acceptable.

Additionally, the device according to the invention may have one or a combination of at least one and/or another of the following additional features:

the movable element includes a movable support relative to which the outer gauge and the inner gauge are movably mounted in the direction of movement and independently of one another, the frame includes an extractor tube having a first end secured to the frame and a second end opposite the first designed to bear on the edge of the ring of the container in the event the container is accidentally lifted, the inner and outer gauges protruding past the second end of the extractor tube, while respectively extending to the inside and outside of the extractor tube, the processing unit, as a function of the measurements of the position of the movable equipment and the instances of contact between the gauges and the container, performs calculations providing additional size information on the necks and rings of the containers, the processing unit calculates, from information provided by the measuring system and the detection systems, the height of the containers, the processing unit commands the inversion of the direction of movement of the drive system, using the instances of contact of one and/or the other of the gauges with the container, the device includes mechanisms for damping the contact between the container and each gauge and returning said gauges to their position, the systems for detecting contact include presence or proximity sensors, preferably of the magnetic type, the inner gauge includes a rod movable relative to the support and guided in translation in a liner mounted inside the extractor tube, that rod being provided at a first end with a testing pin and at its second end, offset relative to the testing pin, with at least part of the system for detecting contact occurring between the inner gauge and the container, the outer gauge includes a testing bell surrounding the extractor tube and movably mounted relative to the support of the movable element, the testing bell is provided with at least one movable axis guided relative to the movable support and provided, as damping mechanism, with at least one spring inserted between the testing bell and the support, the movable axis being provided with at least one part of the system for detecting contact occurring between the outer gauge of the container, the movable support of the movable element includes a piece passed through by the extractor tube and guiding the guide axis or axes of the testing bell, the support of the movable element includes a rack connected at one of its ends to the guide piece of the testing bell and, at its opposite end, to the guide liner of the rod supporting the testing pin, the rack is driven in alternating translation by the drive system, which preferably includes a servomotor, the drive system includes a rotation sensor that is part of the system for measuring the position of the movable element relative to the frame, the testing pin is mounted on the movable rod using a passive compliance system to facilitate the insertion of the testing pin inside containers having sloped or misaligned mouths, the device includes a system for fastening to the chassis of an inspection machine, the fastening system being compatible to allow angular or translational travel between said device and said chassis of the machine, so as to facilitate the insertion of the testing pin inside containers having sloped or misaligned mouths.

Various other features will emerge from the description provided below in reference to the appended drawings, which show, as non-limiting examples, embodiments of the subject-matter of the invention.

FIG. 1 is a perspective view showing one example embodiment of an inspection device according to the invention.

Figure 2:
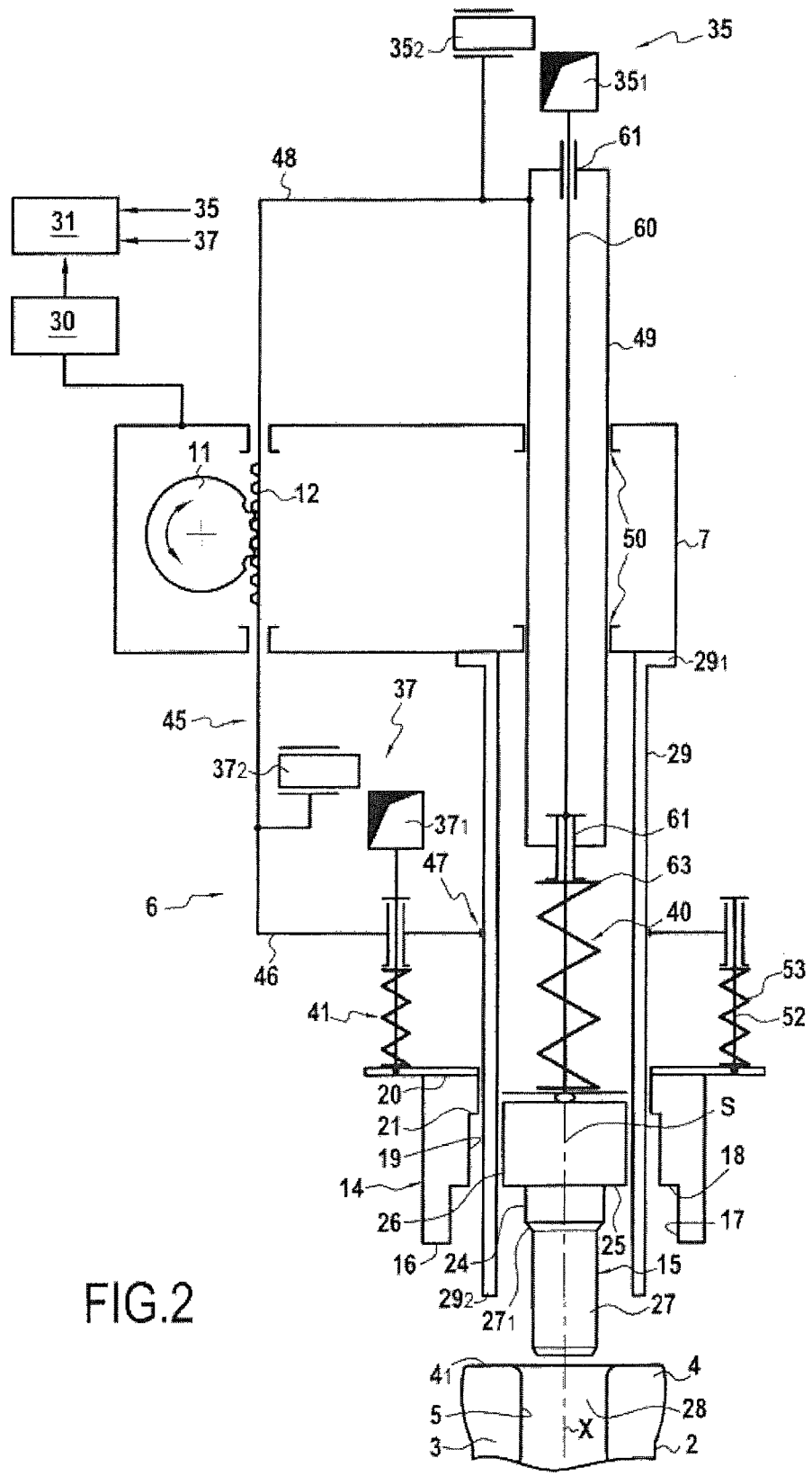
Figure 3:
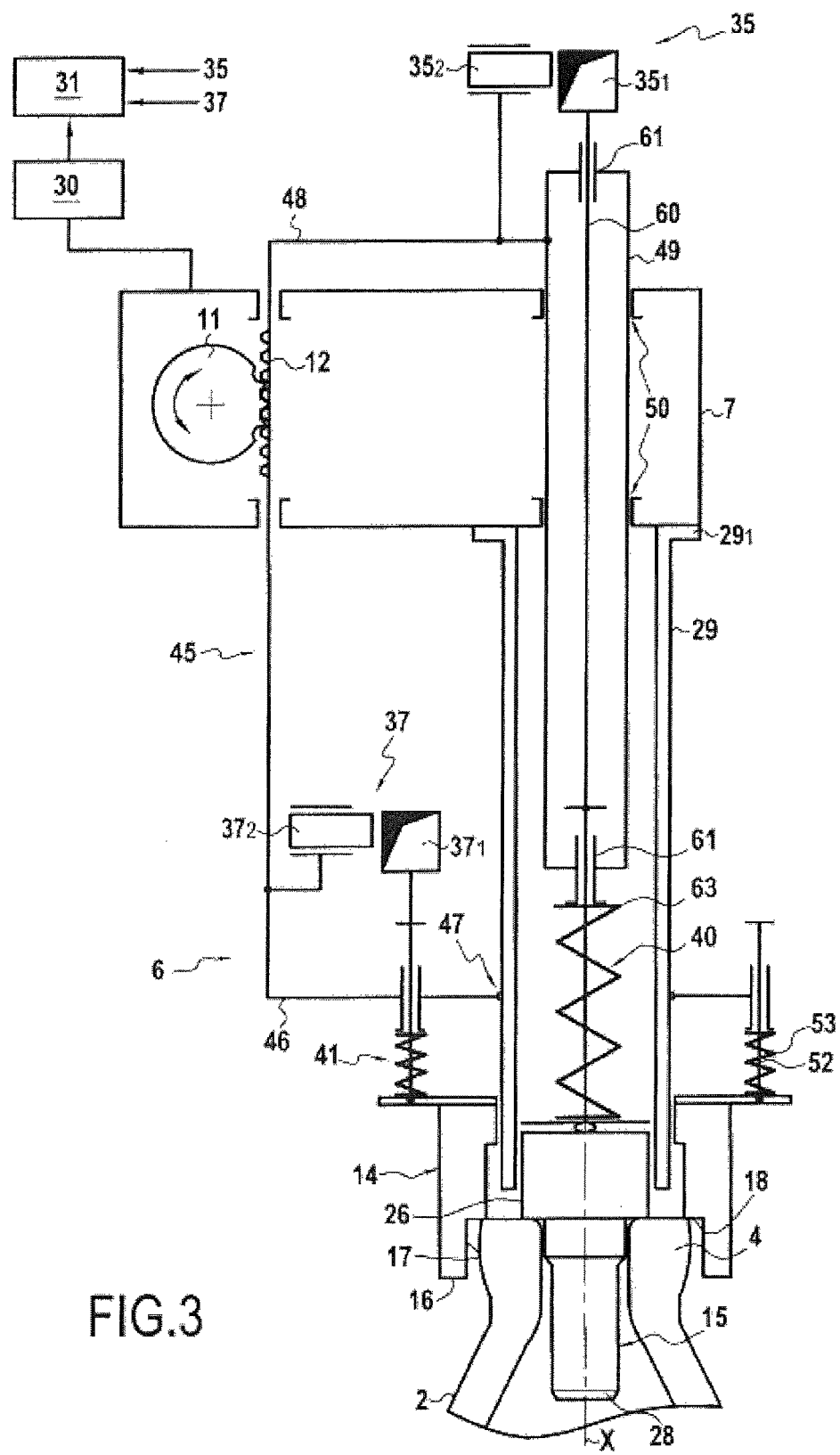

FIGS. 2 and 3 are diagrammatic cross-sectional elevation views of the inspection device according to the invention, respectively in the upper position and the checking position of a container, FIGS. 4A to 4H are cross-sectional elevation views showing different configurations of the inspection device respectively corresponding to checking a faulty ring diameter corresponding to a ring that is too large, a correct bore diameter and correct ring diameter, checking an incorrect ring diameter corresponding to a ring that is too small, an incorrect bore diameter corresponding to a bore diameter that is too large, an incorrect bore diameter corresponding to a blocked neck bore diameter, an equipment release, and a detection corresponding to the absence of a container.

As more specifically shown in FIGS. 1 to 3, the subject-matter of the invention relates to an inspection device enabling the fast-paced inspection 1 of hollow containers 2 of any suitable nature, for example made from glass, having an axis of symmetry X. Traditionally, each container 2 has a neck 3 provided with a ring 4 inwardly delimiting an access opening 5 for accessing the inside of the container 2. More specifically, the inspection device 1 makes it possible to check the neck 3 and the ring 4 of the containers 2 so as to determine the whether the size of the rings and necks of the containers is acceptable and the type of defects for containers whereof the sizes are not acceptable.

The inspection device 1 is designed to equip any machine for producing containers at a fast pace, at the inspection device 1 using suitable means. The production machine and the means for bringing the container to the inspection device 1 and the container handling means are not described, as they are well known by those skilled in the art and are not precisely part of the subject-matter of the invention. The inspection device 1 is mounted on the chassis of an inspection machine integrated or attached in the production machine. In the illustrated example, it should be noted that the containers 2 are brought to the inspection system 1 in an upright or vertical position, such that the axis of symmetry X of the bottle can be considered to extend in a vertical direction.

The inspection device 1 includes a movable element 6 relative to a support frame 7. The movable element 6 is driven by a drive system 9 to ensure the alternating movement of the movable element in a direction of movement parallel to the axis of symmetry X of the containers 2. In the illustrated example, the movable element 6 thus has, for each container 2, a lowering movement and a rising movement in a vertical direction of movement, since the bottle 2 is in an upright position when it is inspected by the device 1 according to the invention. Of course, the device 1 is capable of inspecting bottles placed in different positions.

According to one preferred feature, the drive system 9 includes a servomotor 10, the body of which is fastened on the support frame 7. The servomotor 10 is provided with an output pinion 11 cooperating with a rack 12 that is part of the movable element 6. The servomotor 10 is driven to rotate the output pinion 11 in a direction and an opposite direction to impart a cyclical lowering and rising movement, along the vertical axis, to the rack 12.

The movable element 6 includes an outer gauge 14 for checking the outside of the ring 4 of the containers and an inner gauge 15 for checking the inside of the ring and the neck of the containers 2. As will be explained later in the description, the gauges 14, 15 are driven in an alternating movement by the movable element 6 to come into contact with the container 2 during the lowering movement of the movable element 6.

More specifically, the gauges 14, 15 are mounted concentrically and have a shared axis of symmetry S extending in a vertical direction such that in the inspection position, the axis of symmetry X of the container 2 and the axis of symmetry S are aligned. Upon each lowering movement of the movable element 6 along the vertical axis S, the gauges 14, 15 check the sizes of the ring and the neck of the container that is present. The rising movement of the movable element is used to remove the checked container and bring in the next container to be inspected.

Figure 4A:
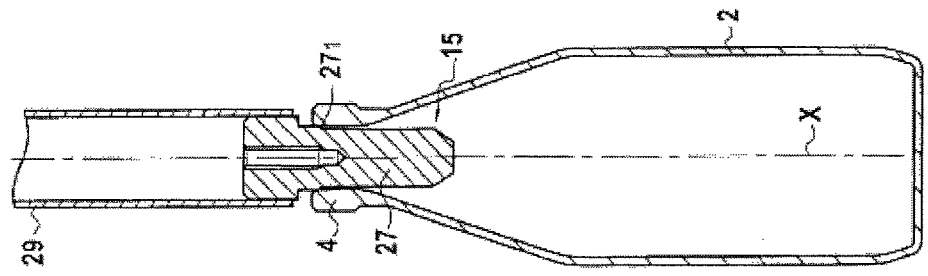

As emerges more particularly from FIGS. 2 and 3, the outer gauge 14 assumes the form of an annular bell centered on the axis of symmetry S. The outer gauge 14 has a lower so-called insertion end 16 defining an opening for a calibration bore 17. The inner diameter of that calibration bore 17 is equal to the largest diameter that may be allowed for the ring 4 of the container. Thus, as illustrated in FIG. 4A, if the ring 4 of the container has a diameter larger than the diameter of the calibration bore 17 (excessively large ring), the ring 4 of the container abuts on the lower end 16 of the outer gauge 14.

The calibration bore 17 is limited by an inner shoulder 18 designed to come into contact with or bear on the locking ring or the rim 4$_1$ of the ring 4.

According to one preferred alternative embodiment, the outer gauge 14 also includes a discharge opening or bore 19 formed beyond the shoulder 18 and communicating with the calibration opening 17 and emerging at the second end 20 of the outer gauge opposite the first lower end 16. This discharge bore 19 is provided with a stop shoulder 21 situated between the second end 20 and the shoulder 18.

Figure 4B:
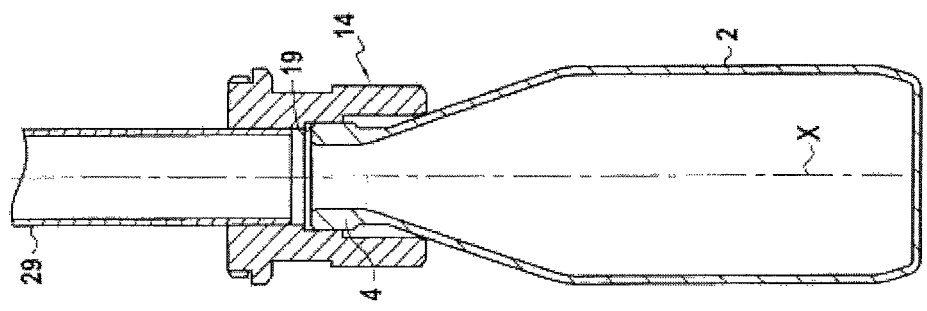

Thus, the calibration bore 17 and the discharge bore 19 define the annular shoulder 18 between them, the width of which corresponds to the allowance range for acceptable ring widths 4 (FIG. 4B). In other words, in all cases where the ring 4 has an acceptable diameter, the outer gauge 14 abuts by its shoulder 18 on the rim 4$_1$ of the ring 4. In the case where the ring 4 has a diameter smaller than the diameter of the discharge bore 19 (FIG. 4C), the discharge bore 19 of the outer gauge 14 receives the ring 4, which then comes into contact with the outer gauge 14 either with the lower end 16 or the stop shoulder 21.

The inner gauge 15 assumes the form of a pin or indicator mounted inside the outer gauge 14 and concentrically relative to the outer gauge 14. The gauge 15, which has a symmetrical form centered on the axis of symmetry S, delimits a lower segment 24 separated by a shoulder 25 from an upper segment 26. The diameter of the upper segment 25 is larger than the diameter of the lower segment 24. The diameter of the lower segment 24 has a diameter corresponding to the minimal diameter that can be allowed by the mouth of the container 2, while the diameter of the upper segment 26 corresponds to the maximum diameter that can be allowed by the mouth of the container. Thus, the annular shoulder 25 that is defined between the upper 26 and lower 24 segments has a width corresponding to the allowance range for the inner diameter of the neck of the container. In the case where the neck 3 has a diameter within the allowed range, the inner gauge 15 abuts by its shoulder 25 on the rim 4$_1$ of the ring (FIG. 4B).

According to one preferred alternative embodiment, the inner gauge 15 also has, from the lower segment 24, an end segment 27 having a smaller diameter relative to the diameter of the lower segment 24. The end segment 27 has a free end 28 or stop that is beveled. The end segment 27 defines a connecting collar 27$_1$ with the lower segment 24.

Figure 4C:
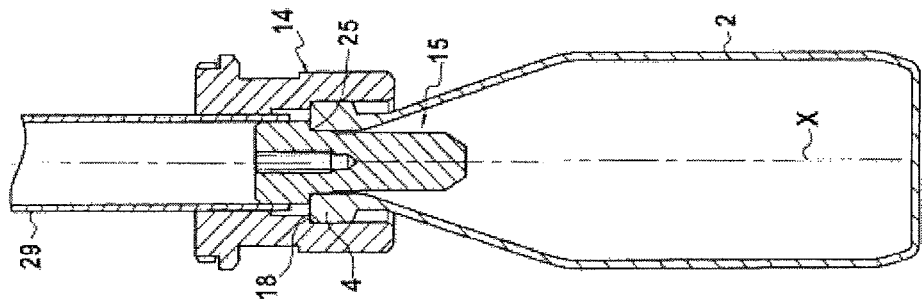
Figure 4D:
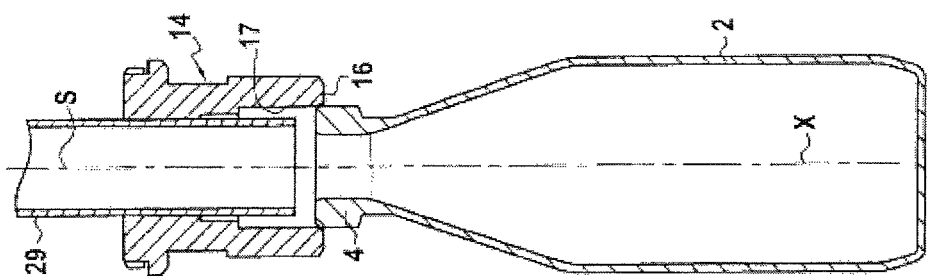
Figure 4E:
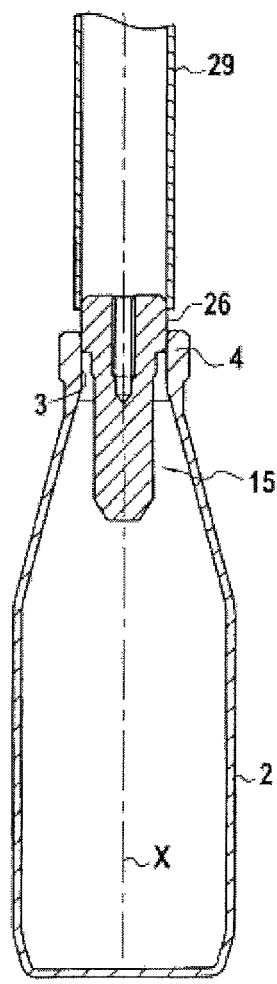
Figure 4F:
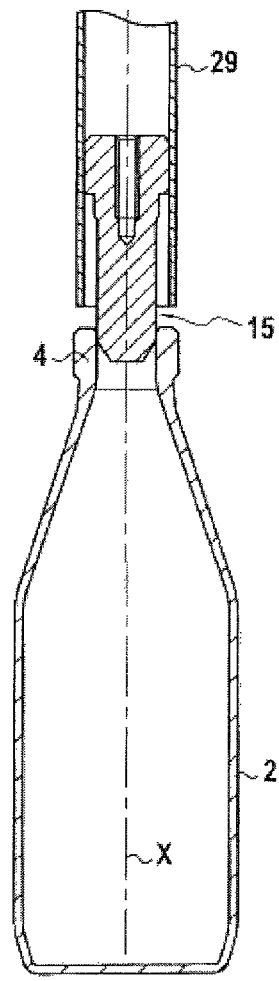

When the neck 3 of the container 2 has too small a diameter, then the pin abuts by its end segment 27, and in particular by its connecting collar 27$_1$, on the container 2 (FIG. 4D). If the inner diameter of the neck 3 is larger than the maximum diameter of the allowed range, then the upper segment 26 penetrates the inside of the neck 3 of the container 2 (FIG. 4E). Furthermore, in the case where the neck of the container has a bore diameter defect (FIG. 4F), the inner diameter 15 abuts at the rim of the ring, by the end segment 27.

According to one preferred feature, an extractor tube 29 is inserted between the outer gauge 14 and the inner gauge 15. This extractor tube 29 includes a first end 29$_1$ fixed to the frame 7 such that its longitudinal axis of symmetry is combined with the axis of symmetry S. The extractor tube 29 includes a second end 29$_2$ opposite the first end 29$_1$, extending between the inner gauge 15 and the outer gauge 14. In other words, the outer gauge 14 extends outside of the extractor tube 29, while the inner gauge 15 extends inside the extractor tube 29.

The diameter of the extractor tube 29 is suitable for allowing the ring 4 to come into contact on the rim 4$_1$ in the event the container rises with the movable element 6, making it possible to free the container from the movable element 6. Of course, the extractor tube 29 has a suitable length to allow the gauges 14, 15 to extend beyond its second end 29$_2$ when the gauges come into contact with the container 2. Likewise, the thickness of the extractor tube 29 is produced so as not to hinder checking of the gauges 14, 15 designed also to bear on the rim 4$_1$ of the ring 4.

Figures 4G, 4H:
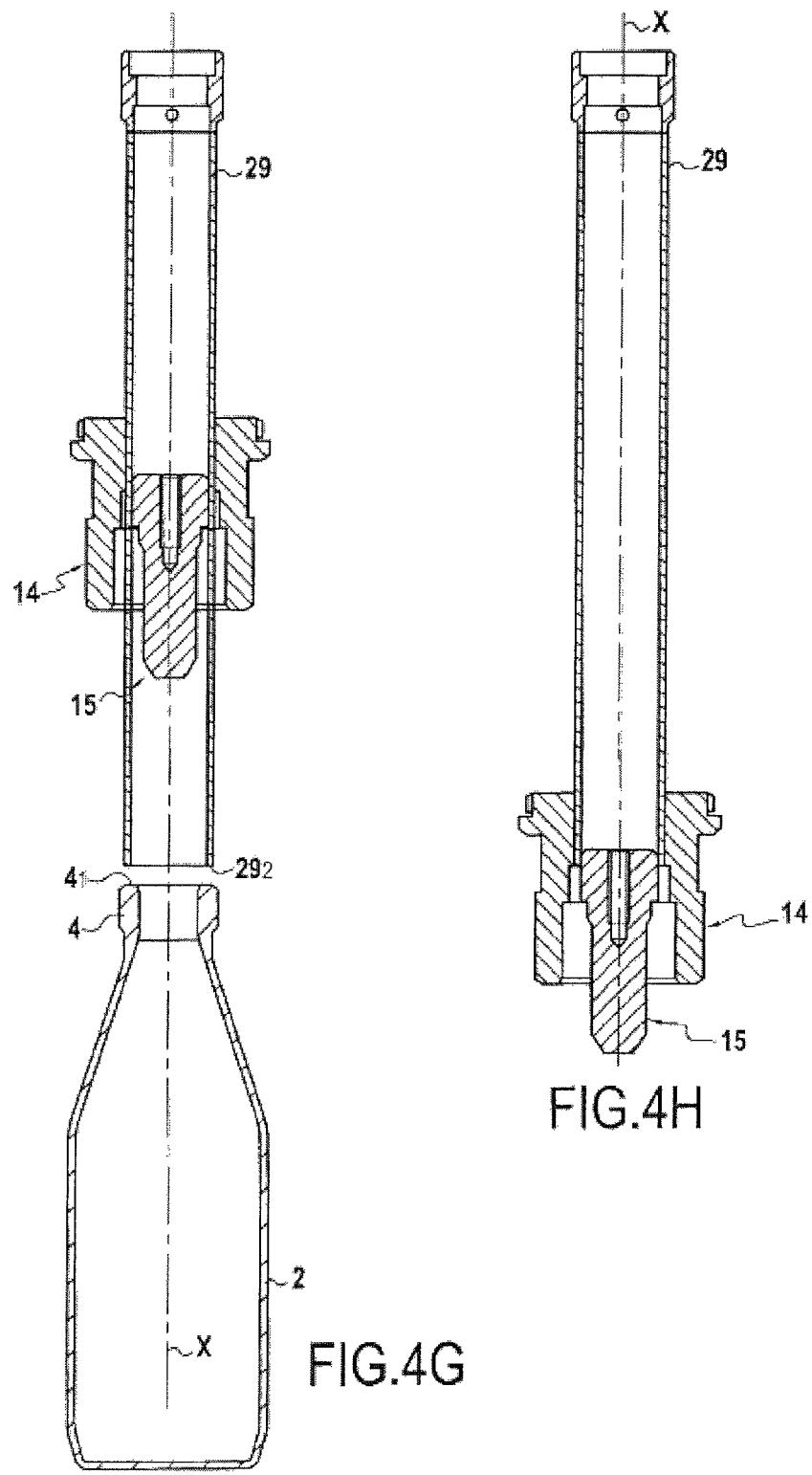

If the container 2 is stuck with one and/or the other of the gauges, the container 2 will be driven by the movable element 6 during the rising movement thereof. During that rising movement, the container 2 will abut, by its rim 4$_1$, on the lower end 29$_2$ of the extractor tube, which separates the container 2 from the movable element 6, which continues to rise (FIG. 4G).

It should be noted that the outer gauge 14 and the inner gauge 15 each detect a defect at a given level of their movement along the vertical axis, the two defects being different. Thus, the inner gauge 15 is for example at a higher altitude during the detection of a plugged neck (FIG. 4F), relative to the altitude when the inner gauge 15 detects a correctly sized neck (FIG. 4B). Likewise, when detecting an excessively large ring diameter (FIG. 4A), the outer gauge 14 is in a position that is at a higher altitude relative to the position occupied by said outer gauge 14 upon detection of a ring diameter that is too small (FIG. 4C).

The inspection device 1 also includes a system 30 for measuring the position of the movable element 6 relative to the frame in the direction of movement of the movable element. That system 30 can be made using any means making it possible to determine the position of the movable equipment 6 along the axis of movement. According to one preferred alternative embodiment, the measuring system 30 includes a position sensor that is part of the servomotor 11. Such a measuring system 30 thus makes it possible to determine the position of the movable element 6, and subsequently of the inner 15 and outer 14 gauges, relative to the frame 7, in the vertical direction in the illustrated example. In other words, such a measuring system 30 makes it possible to provide, along a distance reference established on the vertical axis, the X axis of the movable equipment 6 relative to an origin.

This measuring system 30 is connected to a processing unit 31 of any known type, for example assuming the form of a microcomputer. The measuring system 30 thus provides the processing unit 31 with the measurements of the position of the movable element 6. Inasmuch as the position of the gauges 14, 15 is known relative to the movable element 6, the processing unit 31 knows the position of the gauges 14, 15 relative to the fixed frame.

The inspection system 1 also includes a system 35 detecting contact occurring between the inner gauge 15 and the container 2 during the movement of the movable element 6. This detection system 35 is connected to the processing unit 31. The processing unit 31 is thus able to determine the instances of contact between the inner gauge 15 and the container 2.

The inspection system 1 also includes a system 37 for detecting the contact occurring between the outer gauge 14 and the container 2 during the movement of the movable element 6. This detection system 37 is connected to the processing unit 31. This processing unit 31 is thus capable of determining the instances of contact between the outer gauge 14 and the container 2.

The detection systems 35, 37 are made using suitable means. Preferably, each detection system 35, 37 includes presence or proximity sensors, preferably of the magnetic type.

According to one advantageous alternative embodiment, the outer gauge 14 and the inner gauge 15 are mounted movable in the direction of movement independently of one another and relative to the movable element 6. In other words, it must be understood that each gauge 14, 15 has a possibility of individual movement in the vertical direction of movement upon contact of the gauge with the container 2.

Advantageously, the inspection device 1 includes a so-called inner damping mechanism 40 damping the contact between the container 2 and the inner gauge 15, and returning said inner gauge to its position. The inspection device 1 also includes a so-called outer damping mechanism 41 damping the contact between the container 2 and the outer gauge 14 and returning the outer gauge to its position. Each damping and return mechanism 40, 41 is thus capable of damping the contact occurring between a gauge 14, 15 and the container 2 on the one hand, and returning each gauge 14, 15 to its initial or idle position in the absence of contact with the container 2 on the other hand.

As emerges more precisely from FIGS. 2 and 3, the outer gauge 14 and the inner gauge 15 are movably mounted in the direction of movement relative to a support 45 of the movable element 6. This support 45, which is of course movable relative to the fixed frame 7, includes the rack 12, whereof the lower end is mounted secured to a part 46 ensuring maintenance and guidance of the outer gauge 14. This guide part 46 assumes, in the illustrated example, the form of a plate provided with a passage hole 47 for the extractor tube 29, thereby allowing the vertical sliding movement of the plate 46 relative to the fixed extractor tube 29. The upper end of the rack 12 is mounted secured, by a connecting part 48, to a guide liner 49 extending substantially parallel to the rack 12. This liner 49 is guided in vertical sliding relative to the frame 7 by guide members 50 of any known type. The liner 49 is mounted so as to extend at least partially inside the extractor tube 29.

The support 45 is thus formed by the rack 12, the connecting part 48, the liner 49 and the plate 46. The outer gauge 14 and the inner gauge 15 are mounted movable independently of one another relative to that support 45 and using a damping and return mechanism 41, 40, respectively.

Thus, the outer gauge 14 is provided, as return damping mechanism 41, with at least one, and in the illustrated example 3, guide axis (axes) 52 movably mounted relative to the plate 46. Each axis 52 is provided with a return spring 53 inserted between the outer gauge 14 and the plate 46 to return the outer gauge 14 to the idle position.

In the absence of contact between the outer gauge 14 and the ring 4 of a container, the outer gauge 14 occupies, relative to the support 45, an idle position fixed by the return springs 53 and a stop borne by the axes 52 and bearing on the plate 46 (FIG. 2). During contact between the outer gauge 14 and the ring 4, the outer gauge 14 is subjected to a force causing the outer gauge 14 to rise relative to the support 45, leading to the compression of the return springs 53 (FIG. 3). When the movable element 6 rises, the bearing of the ring 4 on the outer gauge 14 disappears, such that the return springs 53 cause the outer gauge 14 to return to its initial idle position.

The damping and return mechanism 40 includes a rod 60 having a first lower end mounted secured to the inner gauge 15. This rod 60 is mounted inside the liner 49, which, through any suitable guide means 61, guides the sliding of the rod 60 relative to the liner 49.

This rod 60 advantageously includes a spring 63 between the inner gauge 15 and the lower end of the liner 49. In the absence of contact between the inner gauge 15 and the container 2, the spring 63 acts on the inner gauge 15 so that the latter is in an idle position relative to the guide liner 49. The rod 60 is kept in a position using the stop borne by the rod and bearing on the liner 49 (FIG. 2). In the case of bearing of the inner gauge 15 on the ring 4, the inner gauge 15 is subjected to a force causing the rod 60 to rise relative to the guide liner 49 (FIG. 3). When the bearing of the gauge 15 on the ring 4 is eliminated, the spring 63 tends to return the inner gauge 15 to its initial idle position.

According to one preferred alternative embodiment, the detection system 37 for detecting contact occurring between the outer gauge 14 and the container 2 is mounted between the support 45 and the outer gauge 14. Thus, the detection system 37 includes a moving detection part $37_1$ mounted on the end of a guide axis 52 and a stationary part $37_2$ mounted on the rack 12. When contact occurs between the outer gauge 14 and the container 2, the axis 52 slides relative to the rack 12, leading to a change in relative position between the stationary $37_2$ and moving $37_1$ parts of the detection system (FIG. 3). Thus, the detection system 37 detects the occurrence of contact between the outer gauge 14 and the container 2.

According to one preferred alternative embodiment, the detection system 35 for detecting contact occurring between the gauge 15 and the container 2 is mounted between the support 45 and the inner gauge 15. Advantageously, this detection system 35 is offset relative to the inner gauge 15. In fact, the rod 60 is equipped, at its end opposite that provided with the inner gauge 15, with a moving detection part 35₁ that is part of the detection system 35, which also includes a stationary part 35₂ fixed on the connecting part 48. When contact occurs between the inner gauge 15 and the container 2, the rod 61 slides relative to the connecting part 48, leading to a change in relative position between the stationary 35₂ and moving 35₁ parts of the detection system. Thus, the detection system 35 detects the instances of contact between the inner gauge 15 and the ring of the container 2.

The instances of contact detected by the detection systems 35, 37 are sent to the processing unit 31, which is capable, for measurements delivered by the system 30 for measuring the position of the movable element 6, of determining whether the size of the rings and necks of the containers 2 is acceptable. In fact, each contact position of the gauges 14, 15 corresponds to a different size check of the ring and neck of the container. Using a calibration operation, it is possible to determine the theoretical vertical position of the gauges 14, 15 corresponding to a container with no defects and, subsequently, a container with defects.

Inasmuch as the position of the movable element 6 is known relative to the frame 7, i.e., also relative to the placement plane of the containers 2, the processing unit 31 is capable of determining the height of the containers from the instance of contact of the outer gauge 14 on the ring of the container and/or the instance of contact of the inner gauge 15.

The operation of the inspection device 1 follows directly from the preceding description.

After a container 2 is brought to the inspection device 1, the drive system 9 is driven to lower the movable equipment 6. Once a gauge 14, 15 comes into contact with the container 2, the contact is detected using the associated detection system 35, 37. At that moment, the processing system 31 uses the measuring system 30 to determine the position of the gauge coming into contact with the container, such that the processing unit 31 is capable of determining the size compliance of the container and the type of defect detected for containers whereof the size is not acceptable. Advantageously, the processing unit 31 determines, as a function of the instances of contact of the two gauges 14, 15 and the measuring system 30, the position of the movable equipment 6 at the time of the contacts of the gauges 14, 15 with the container 2. The processing unit 31 uses these measurements and instances to perform calculations providing additional size information on the necks and rings of the containers 2, and in particular on the types of defects exhibited by the containers 2.

Thus, as a function of the vertical position occupied by each of the gauges 14, when at least one contact occurs with the container, the processing unit 31 is capable of precisely determining the size compliance of the ring and the neck of the container. As explained above, depending on the vertical position occupied by each of the gauges 14, 15, when at least one contact occurs with the container, the processing unit 31 is capable of precisely determining the size compliance of the ring and the neck of the container, since it is possible to determine the type of defect from among the following defects:

defect of the inner diameter of the neck smaller than the minimum allowed diameter (bore diameter or PLUG or bore defect), defect of the bore diameter smaller than the minimum allowed diameter (bore diameter defect), defect of the bore diameter larger than a maximum allowed diameter (bore diameter defect), height defects greater than the allowed maximum, height defects smaller than the allowed minimum, outer diameter defect smaller than the allowed minimum, and outer diameter defect larger than the allowed maximum.

It should be noted that using the instances of contact of one and/or the other of the gauges 14, 15 with the container 2, the processing unit 31 can, depending on the measured position of the movable element 6, command the conversion of the direction of movement of the drive system aiming to raise the movable element 6. In practice, for containers with acceptable sizes, the gauges 14, 15 simultaneously come into contact with the container 2. In the case where a container is absent (FIG. 4H), none of the detection systems 35, 37 detects contact. The processing unit 31 is capable of commanding raising of the movable element 6 by driving the drive system 9, when the movable element 6 reaches a previously determined lower vertical position.

The inspection device 1 according to the invention makes it possible to inspect the rings and necks of all types of containers. Most often, the inspection device 1 is mounted on the chassis of an inspection machine, the input means of which are a star conveyor.

In theory, when the containers 2 are positioned to be checked by the inspection device 1, the axis of symmetry X of the containers coincides with the axis of movement of the gauges 14 and 15. However, in practice, it must be considered the positioning errors of the containers are possible, or that container mouths may be tilted. It is therefore necessary to give the device 1 a compliance or elasticity capacity. According to one alternative of the invention, the fastening system for fastening the device 1 that physically connects the frame 7 to the chassis of the inspection machine is capable of flexibility, i.e., it allows limited movements of the device 1 relative to the chassis of the inspection machine. The degrees of freedom allowed are either two rotations with axes perpendicular to each other and perpendicular to the axis X, or two translations perpendicular to each other and perpendicular to the axis X, or more complex movements, such as a circular path around the axis of rotation of the star of the machine, and translation along an axis passing through the axis of rotation of the star. These return forces automatically return the device, when idle, to an aligned position on the theoretical axis X.

Preferably, the fastening system has passive compliance. Indeed, the physical means for providing this elasticity are preferably elastic supports, i.e., in which rigid metal parts are connected to each other by parts made from a flexible and elastic or compressible and resilient material, for example polymers, which allow rotations along a horizontal axis tangential to the star and a horizontal axis radial relative to the star, the degree of movement being higher for the rotation of the radial axis. It is, however, possible to provide more complex mechanical subassemblies comprising mechanical guides, stops, and return springs.

According to one preferred alternative of the invention, the rod 60 is mounted secured to the inner pin 15 by means of a system also having a certain flexibility, which allows the gauge to assume a limited angle with the axis of the rod and/or the axis X, which facilitates the insertion thereof into the mouth. Thus, the testing pin 15 is mounted on the movable rod

60 using a passive compliance system to facilitate the insertion of the testing pin inside containers 2 having sloped or misaligned mouths.

The invention is not limited to the examples described and shown, as various modifications may be made thereto without going beyond the scope of the invention.

The invention claimed is:

1. A device for inspecting the rings and necks of containers (2), including a movable element (6) driven by a drive system (9) in an alternating movement relative to the frame (7), in a direction of movement parallel to the axis of symmetry of the containers, the movable element being provided with an outer gauge (14) for checking the outside of the ring of the containers, and an inner gauge (15) for checking the inside of the ring and neck of the containers, characterized in that it includes:
- a system (30) for measuring the position of the movable element (6) relative to the frame, in the direction of movement, the measurements of the position of the movable element being provided to a processing unit (31),
- a system (35) for detecting the contact between the inner gauge (15) and the container (2), during the movement of the movable element (6), the instances of contact being provided to the processing unit (31),
- a system (37) for detecting the contact between the outer gauge (14) and the container (2), during the movement of the movable element, the instances of contact being provided to the processing unit (31), and
- a processing unit (31) for determining, on the basis of the measurements of the position of the movable element (6) and of the instances of contact between the gauges (14, 15) and the container (2), whether or not the size of the rings and/or necks of the containers are acceptable, and the types of defects for the containers whereof the sizes of the rings and/or necks are not acceptable.

2. The inspection device according to claim 1, characterized in that the movable element (6) includes a movable support (45) relative to which the outer gauge (14) and the inner gauge (15) are movably mounted in the direction of movement and independently of one another.

3. The inspection device according to claim 1, characterized in that the frame (7) includes an extractor tube (29) having a first end secured to the frame (7) and a second end opposite the first designed to bear on the edge of the ring (4) of the container (2) in the event the container is accidentally lifted, the inner (15) and outer (14) gauges protruding past the second end of the extractor tube, while respectively extending to the inside and outside of the extractor tube.

4. The inspection device according to claim 1, characterized in that the processing unit (31), as a function of the measurements of the position of the movable equipment (6) and the instances of contact between the gauges (14, 15) and the container (2), performs calculations providing additional size information on the necks and rings of the containers (2).

5. The inspection device according to claim 1, characterized in that the processing unit (31) calculates, from information provided by the measuring system (30) and the detection systems (35, 37), the height of the containers.

6. The inspection device according to claim 1, characterized in that the processing unit (31) commands the inversion of the direction of movement of the drive system (9), using the instances of contact of one and/or the other of the gauges (14, 15) with the container (2).

7. The inspection device according to claim 1, characterized in that it includes mechanisms (40, 41) for damping the contact between the container (2) and each gauge (14, 15) and returning said gauges to their position.

8. The inspection device according to claim 1, characterized in that the systems (35, 37) for detecting contact include presence or proximity sensors, preferably of the magnetic type.

9. The inspection device according to claim 3, characterized in that the inner gauge (15) includes a rod (60) movable relative to the support (45) and guided in translation in a liner (49) mounted inside the extractor tube (29), that rod (60) being provided at a first end with a testing pin (15) and at its second end, offset relative to the testing pin, with at least part ($35_1$) of the system (35) for detecting contact occurring between the inner gauge (15) and the container (2).

10. The inspection device according to claim 3, characterized in that the outer gauge (14) includes a testing bell surrounding the extractor tube (29) and movably mounted relative to the support (45) of the movable element.

11. The inspection device according to claim 10, characterized in that the testing bell (14) is provided with at least one movable axis (52) guided relative to the movable support (45) and provided, as damping mechanism (41), with at least one spring (53) inserted between the testing bell and the support (45), the movable axis being provided with at least one part ($37_1$) of the system (37) for detecting contact occurring between the outer gauge (14) of the container (2).

12. The inspection device according to claim 11, characterized in that the movable support (45) of the movable element (6) includes a piece (46) passed through by the extractor tube (29) and guiding the guide axis or axes (52) of the testing bell.

13. The inspection device according to claim 2, characterized in that the support (45) of the movable element (6) includes a rack (12) connected at one of its ends to the guide piece (46) of the testing bell and, at its opposite end, to the guide liner (49) of the rod (61) supporting the testing pin (15).

14. The inspection device according to claim 11, characterized in that the rack (12) is driven in alternating translation by the drive system (9), which preferably includes a servomotor.

15. The inspection device according to claim 14, characterized in that the drive system (9) includes a rotation sensor that is part of the system (30) for measuring the position of the movable element (6) relative to the frame (7).

16. The inspection device according to claim 9, characterized in that the testing pin (15) is mounted on the movable rod (60) using a passive compliance system to facilitate the insertion of the testing pin inside containers (2) having sloped or misaligned mouths.

17. The inspection device according to claim 1, characterized in that it includes a system for fastening to the chassis of an inspection machine, the fastening system being compatible to allow angular or translational travel between said device (1) and said chassis of the machine, so as to facilitate the insertion of the testing pin inside containers (2) having sloped or misaligned mouths.

* * * * *